United States Patent
Capone (10) Patent No.: US 10,404,708 B2
(45) Date of Patent: Sep. 3, 2019

(54) SYSTEM FOR SECURE FILE ACCESS

(71) Applicant: Folium LLC, Los Gatos, CA (US)

(72) Inventor: Jeffrey Capone, Melon Park, CA (US)

(73) Assignee: Secure Circle, LLC, Los Gatos, CA (US)

( * ) Notice: Subject to any disclaimer, the term of this patent is extended or adjusted under 35 U.S.C. 154(b) by 434 days.

(21) Appl. No.: 15/171,134

(22) Filed: Jun. 2, 2016

(65) Prior Publication Data

US 2016/0359859 A1    Dec. 8, 2016

Related U.S. Application Data (60) Provisional application No. 62/170,209, filed on Jun. 3, 2015.

(51) Int. Cl.

| | |
|---|---|
| *G06F 16/00* | (2019.01) |
| *H04L 29/06* | (2006.01) |
| *G06F 16/176* | (2019.01) |
| *G06F 21/60* | (2013.01) |
| *G06F 21/62* | (2013.01) |

(52) U.S. Cl.
CPC .......... *H04L 63/101* (2013.01); *G06F 16/176* (2019.01); *G06F 21/60* (2013.01); *G06F 21/6218* (2013.01)

(58) Field of Classification Search
CPC ............ G06F 21/31; G06F 2221/2141; G06F 2221/2149; G06F 21/62; G06F 21/42; G06F 21/60; G06F 17/30289; G06F 17/30557; G06F 17/30864; G06F 16/176; G06F 16/122; G06F 16/583; G06F 16/683; G06F 21/6218

USPC .................................................. 707/705–788
See application file for complete search history.

(56) References Cited

U.S. PATENT DOCUMENTS

| | | | |
|---|---|---|---|
| 7,418,435 B1* | 8/2008 | Sedlar ................. | G06F 16/188 |
| 8,868,626 B2 | 10/2014 | Iftode et al. | |
| 9,449,007 B1* | 9/2016 | Wood .................. | G06F 17/3012 |
| 2005/0182958 A1* | 8/2005 | Pham ...................... | G06F 21/51 |
| | | | 726/22 |

(Continued)

OTHER PUBLICATIONS

Rutgers University; Novel Architecture for Controlling File System Access; downloaded from http://discolab.rutgers.edu/filewall/docs/fwpatent_summary.pdf on Feb. 3, 2015—(3) pages.

(Continued)

*Primary Examiner* — Michelle N Owyang
(74) *Attorney, Agent, or Firm* — Boyle Fredrickson, SC (57) ABSTRACT

A virtual local file system for managing file access, such as read, write and execute, of files on local media is disclosed. An access manager, executable by the host operating system, is stored on each host device. The access manager interacts with the local file system to control file access permissions and how processes of the host operating system execute, view or modify files accessible to the local file system. The access manager may also dynamically control file access to files on the host operating system using a file attributes repository, which may be stored locally or remotely from the host device. Exemplary attributes for defining permission to access a file include but not are limited to, specific users, a time of day, a number of copies of a file, an allowed process, an IP address range, and a MAC address.

16 Claims, 5 Drawing Sheets

(56) References Cited

U.S. PATENT DOCUMENTS

| | | | | |
|---|---|---|---|---|
| 2010/0235649 | A1* | 9/2010 | Jeffries | G06F 21/6209 |
| | | | | 713/189 |
| 2012/0310983 | A1* | 12/2012 | Mittal | G06F 21/44 |
| | | | | 707/785 |
| 2015/0074409 | A1* | 3/2015 | Reid | H04L 63/061 |
| | | | | 713/171 |
| 2015/0135300 | A1* | 5/2015 | Ford | G06F 16/93 |
| | | | | 726/11 |
| 2015/0302220 | A1* | 10/2015 | Cismas | H04L 63/102 |
| | | | | 707/783 |
| 2015/0312227 | A1* | 10/2015 | Follis | H04L 63/0428 |
| | | | | 713/176 |
| 2016/0259811 | A1* | 9/2016 | MacKay | G06F 16/178 |

OTHER PUBLICATIONS

Stephen Smaldone, Aniruddha Bohra, and Liviu Iftode; Filewall: A Firewall for Network File Systems; In Proceedings of the 3rd IEEE International Symposium on Dependable, Autonomic, and Secure Computing (DASC'07), Baltimore, MD, Sep. 2007—(10) pages.

* cited by examiner

FIG. 6

SYSTEM FOR SECURE FILE ACCESS

CROSS-REFERENCE TO RELATED APPLICATIONS

This application claims priority to U.S. provisional application Ser. No. 62/170,209, filed Jun. 3, 2015, the entire contents of which is incorporated herein by reference.

FIELD OF THE INVENTION

The subject matter disclosed herein relates generally to a secure system for accessing files and, in particular, to a system to manage access to files across an enterprise whether the files are accessed internally to or externally from the physical systems of the enterprise.

BACKGROUND OF THE INVENTION

Managing access to a company's electronic data presents a number of challenges for enterprises such as companies, university and other educational organizations, hospitals, local, state, and Federal government agencies. etc. The rapid expansion of bring-your-own-device (BYOD), telecommuting, mobile computing devices, such as laptops, tablets, and smart phones, have created an environment in which an ever-increasing number of devices need to access data and often need to access data from outside an enterprise's physical location.

Historically, enterprises have purchased enterprise management software in an attempt to control access to data stored on network drives. However, existing enterprise management software is limited to controlling access to files only by computing devices connected to the network on which the enterprise management software is installed if a file is copied to another computer, to a local drive, to a removable storage medium, or mailed to a user outside of the enterprise, the enterprise management software can no longer manage access to the file.

As a result of absence of managed file access, access to sensitive data may be inappropriately enabled by first removing it from a device managed by the enterprise management software. For example, a sales representative may copy an employer's customer list to a flash drive prior to leaving a company. Upon starting employment at a competing company, the sales representative may access the customer list and let prior customers know that he has moved to the competing company.

Even if the removal was authorized, the potential still exists for unauthorized access. An employee may copy files to a laptop or flash drive in preparation for a conference, meeting, or for other business to be conducted external to the enterprise. If the laptop or flash drive is lost or stolen, the files may be accessed by whoever comes into possession of the laptop or flash drive.

Thus, it would be desirable to provide an improved file access system that can manage enterprise data on devices both within and external to the enterprise's virtual or actual network.

SUMMARY OF THE INVENTION

In accordance with a first aspect of the invention, a virtual local file system is provided for storing data in the form of a file and for managing file access, such as read, write and execute, of files stored on local media. The virtual local file system is implemented by an access manager which may be, for example, a process executable by the host operating system. The access manager interacts with the local file system to control file access permissions and how processes of the host operating system execute, view or modify files accessible to the local file system. The access manager may be configured to operate with various operating systems while still being able to manage file access permissions of files stored on the host device independent of the host operating system. The access manager may also dynamically control file access to files on the host operating system using a file attributes repository, which may be stored locally or remotely from the host device. Exemplary attributes for defining permission to access a file include but not are limited to specific users, a time of day, a number of copies of a file, an allowed process, an IP address range, and a MAC address.

According to one embodiment of the invention, a system for managing access to a plurality of files on a storage module in communication with a computing device is disclosed. The system includes an access manager, at least one file container, and a file attribute database. The access manager is operative to receive a file access call by an operating system on the computing device. Each file container is stored on the storage module and includes one of the plurality of files and a signature. The file attribute database includes access rights to the file in each of the at least one file containers, and the access manager permits the file access call to access the file in the file container based on at least one attribute for the file stored in the file attribute database.

According to another aspect of the invention, a first portion of the plurality of files are stored on the storage module outside of one of the at least one file containers and a second portion of the plurality of files are stored on the storage module in one of the at least one file containers. The access manager is operative to identify whether the file access call requested one of the files in the first portion or one of the files in the second portion, pass each file in the first portion to the operating system without checking the file attribute database, and check the file attribute database to determine a file permission for each file in the second portion.

According to other aspects of the invention, the file container may be a file stored on the storage module in communication with the computing device. The computing device may be a first computing device and the file attribute database may be stored on a second computing device remote from the first computing device. The first computing device is connected to the second computing device via a network, and the file attribute database can be read and updated by the access manager running on the first computing device. Optionally, at least a portion of the file attribute database is stored on the storage module. A file permission associated with the at least one attribute for the file in the file attribute database is dynamically modified by the access manager, and the at least one attribute for the file may be an IP address of a host of the file, a MAC address of the host of the file, a number of times the file has been opened, or users of an external registration system.

According to still another aspect of the invention, the system includes an authorized list, identifying a plurality of applications that are allowed to access file data stored in a file container. The access manager is further operative to receive a file access request from a calling application to access either one of the plurality of files or the at least one file container and to determine whether the calling application is present in the authorized list. The access manager passes a file handle to the calling application corresponding to the requested file or file container when the calling application is not in the authorized list and reads the signature from the file container and checks the file attribute database when the calling application is present in the authorized list.

According to another embodiment of the invention, a method of managing access to file data by a computing device in communication with a storage medium on which the file data is stored is provided. The file data is stored in a file container including a signature corresponding to the file container, and a request to access the file container is received with an access manager from an application executing on the computing device. The signature is read from the file container with the access manager, and at least one file attribute for the file container is checked as a function of the signature to authorize access to the file container. The access manager passes the file data to the application when the at least one file attribute indicates the access request is authorized.

According to still another aspect of the invention, checking the at least one file attribute for the file container as a function of the signature to authorize access to the file may include identifying the at least one file attribute in a file attribute database, where the at least one file attribute is associated with the signature, and reading the at least one file attribute and a file permission associated with the at least one file attribute from the file attribute database.

According to still another embodiment of the invention, a system for managing access to a storage module in communication with a computing device is disclosed. The storage module includes at least one file stored inside a file container and at least one file stored without a file container, and the system includes an operating system and an access manager, each of which is operative on the computing device. The operating system is configured to receive an operating system function call from an application operating on the computing device to access a file, and generate a file access request to a file system managing file storage on the storage module responsive to the operating system function call. The access manager is configured to receive each file access request to the file system generated by the operating system, read the file data from the file identified by the file access request, identify whether the file is stored inside the file container or stored without the file container, and read at least one file attribute corresponding to a file permission for the file from a file attribute database when the file is stored inside the file container.

According to yet another aspect of the invention, each file container includes metadata for one file, file data for one file, and a signature corresponding to the file container. When the file access request is a read request and the file is stored inside the file container, the access manager is further configured to verify that the file permission corresponding to the at least one file attribute permits a read. When a read is permitted, the access manager reads the file data from the file container and passes the file data to the application operating, on the computing device. When a read is not permitted, the access manager denies access of the file data to the application operating on the computing device. When the file access request is a write request and the file is stored inside the file container, the access manager is further configured to verify that the file permission corresponding to the at least one file attribute permits a write. When the write is permitted, the access manager updates the at least one file attribute in the file attribute database writes the signature to the file container, and writes the file data to the file container. When a write is not permitted, the access manager prohibits writing to the file data by the application operating on the computing device. When the file is stored without the file container, the access manager is further configured to execute the file access request in the same manner as the operating system.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings furnished herewith illustrate a preferred construction of the present invention in which the above advantages and features are clearly disclosed as well as others which will be readily understood horn the following description of the illustrated embodiment.

In the drawings.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
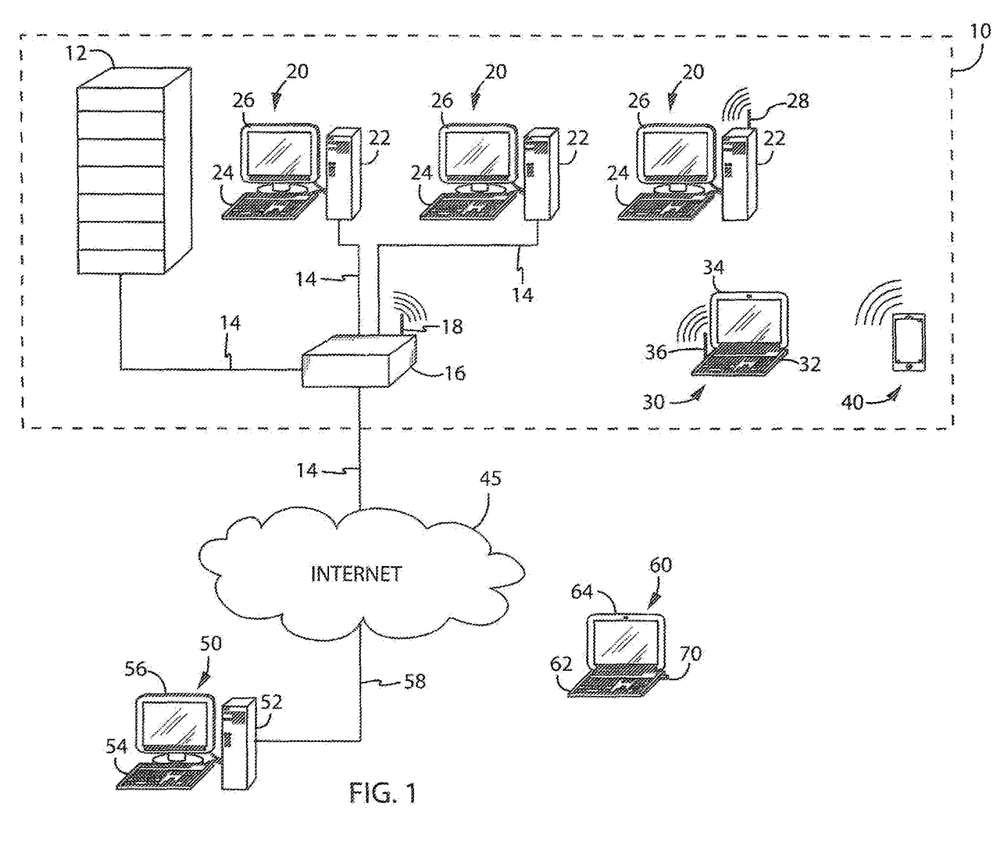
FIG. 1 is an environmental view of an exemplary enterprise incorporating one embodiment of the invention.

Referring to FIG. 1, an exemplary environment in which one embodiment of a system for secure file access is illustrated. An enterprise 10, such as a business or one location of a business includes many different connected devices. Other examples of enterprises that may form a suitable environment for embodiments of the invention include, but are not limited to, university and other educational organizations, hospitals, local, state, and Federal government agencies. The system may be configured to provide secure file access across each of the computing devices within the enterprise 10. According to the illustrated embodiment the enterprise 10 includes a server 12 on which data is stored. The server 12 may be a single computing device or multiple computing devices located on-site with or off-site from the computing devices 20. The multiple computing devices forming the server may include, for example, multiple, rack mounted devices, desktop devices, or a combination thereof. It is further contemplated that the multiple computing devices forming the server 12 may be located in a single location or in multiple locations throughout the enterprise 10.

A network cable 14 connects the server 12 to a network device 16. Optionally, the server 12 may be connected to the network via a wireless connection. The network device 16 may be a router, a switch, a gateway, or any other device configured to receive and retransmit messages along a network. The network device 16 may also include an antenna 18 to provide a wireless connection with one or more computing devices on the network.

One or more first computing devices 20, such as a desktop computer, may be connected to the network device 16 via a network cable 14. Optionally, one of the first computing devices 20 may be connected to the network via a wireless connection and may also include an antenna 28 for communication with the antenna 18 on the network device 16. Each of the first computing devices 20 includes a housing 22 including, for example, a motherboard on which a processor and memory are mounted. Each of the first computing devices 20 further includes one or more user interfaces, such as a keyboard 24, a touch screen, and/or a mouse, and a display 26. One or more second computing devices 20, such as a notebook or laptop computer, may also be connected to the network device 16 via a wired or wireless connection. According to the illustrated embodiment, a laptop computer 30 includes a user interface 32, such as keyboard, a touchpad, or the like, a display 34 and a data port and/or an antenna 36 to establish a wired and/or a wireless communication with the network device 16. Still other computing devices 40 may be configured to be connected to the network device 16. The other computing devices 40 include tablets, smart phones, and other Wi-Fi enabled devices that most typically include an internal antenna for wireless connection to the network device 16.

The secure file access system may also be configured to manage access to enterprise files via remote devices. Referring still to FIG. 1, a first remote computing device 50 may be connected to the enterprise 10 via the Internet 45. Both the network device 16 in the enterprise and the remote computing device 50 may have a wired connection 14, 58 to the Internet 45. Optionally, either the network device 16 or the remote computing device 50 may be wirelessly connected to the Internet 45. According to the illustrated embodiment, the remote computing device 50 includes a housing 52 including, for example, a motherboard on which a processor and memory are mounted. The remote computing device 50 further includes one or more user interfaces, such as a keyboard 54, a touchpad, and/or mouse, and a display 56. A second remote computing device 60 may be unable to connect to the enterprise 10. The second remote computing device 60 includes a user interface 62, such as keyboard, touchpad, or the like, and a display 64. A mobile data storage device 70, such as a Universal Serial Bus (USB) drive, memory card, and the like may be used to transfer files between the server 12 or a computing device 20 in the enterprise 10 and the second remote computing device 60.

Figure 2:
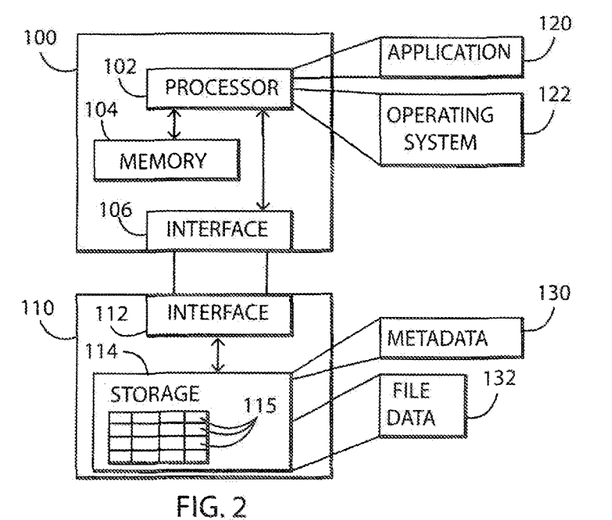
FIG. 2 is a block diagram representation of a processing unit and a storage device from FIG. 1.

Turning next to FIG. 2, a general block diagram representing the computing devices 20, 30, 40, 50, 60 of FIG. 1 is illustrated. It is understood that each computing device 20, 30, 40, 50, 60 may have various configurations and additional components to those illustrated. Further, the block diagram represents general elements of each computing device 20, 30, 40, 50, 60, and the general elements may vary between devices. According to the general block diagram, each computing device includes a processing component 100 with a processor 102 and memory 104 in communication with the processor 102. The memory 104 may include volatile memory, non-volatile memory, or a combination thereof. Each computing device further includes a physical data storage module 110. The data storage module 110 may be, for example, a hard drive, a solid state drive, a removable memory card, and the like. A processor interface 106 and a storage interface 112 are physical layers in the processing component 100 and the data storage module 110, respectively, which establish communication between the processor 102 and the physical data storage module 110. The data storage module 110 includes block storage 114 on which data and files are saved. Each file stored in the data storage module 110 may include metadata 130 and file data 132. The metadata 130 may include, for example, pointers to particular blocks 115 in the block storage 114 at which the file data 132 is stored.

Each computing device 20, 30, 40, 50, and 60 further includes an operating system 122 to manage the resources of the computing device and to provide common services between applications 120 executing on the computing device. The operating system 122 may be stored on the data storage module 110, the memory 104 for the processing component 100, or a combination thereof. The operating system 122 may vary between computing devices and is configured to control the hardware components for the associated computing device. The processor 102 is configured to execute the operating system 122 and each of the applications 120 stored in the memory 104 or data storage module 110.

Figure 3:
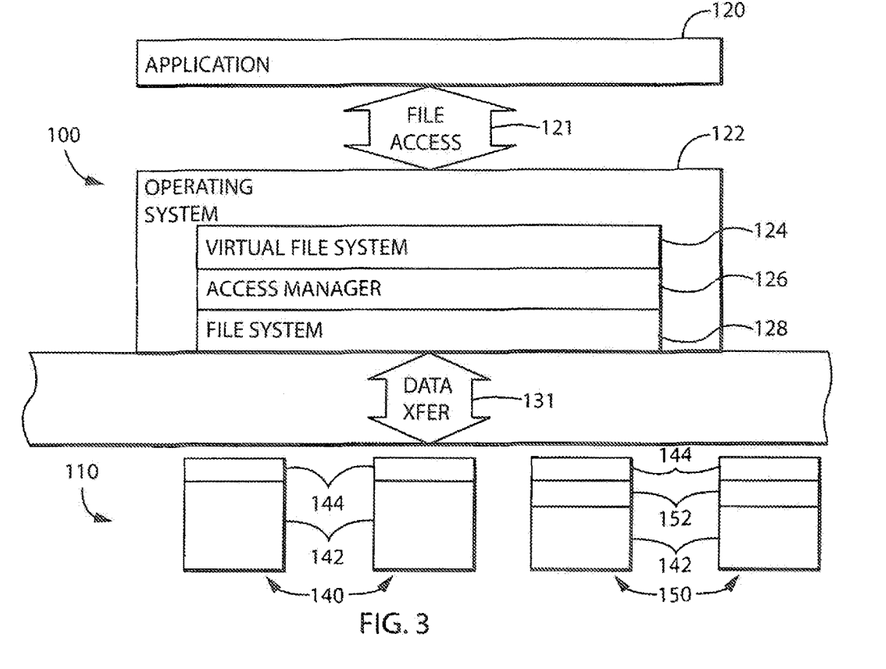
FIG. 3 is a block diagram representation of a secure file access according to one embodiment of the present invention.

With reference next to FIG. 3, the secure file access system includes an access manager 126 loaded onto each computing device for which the system wishes to maintain secure access to the enterprise files. The access manager 126 may be a device driver, application program interface (API), or other such routine or protocol configured to be loaded onto the computing device. The access manager 126 may be stored in memory 104 for the processing component 100 or on the data storage module 110. During power-up or during initialization of the operating system 122, the operating system detects the presence of the access manager 126 on the computing device and utilizes the access manager 126 when applications 120 attempt to accesses file data 142. The data storage module 110 may contain file data 142 that both requires secure access and is accessible by any program. A standard data file 140, which is not managed by the access management system may include file data 142 and metadata 144. Although shown as a continuous block, it is understood that the metadata 144 typically is contained in a separate location according to the operating system 122 in use on the device, and the file data 142 may be stored in nonconsecutive blocks 115 at multiple locations throughout the storage module 110. The metadata 144 for the file 140 may contain pointers to the locations at which the file data 142 is stored according to the operating system 122 requirements. File data 142 that is managed by the access manager 126 is placed in a file container 150.

The file container 150 includes the file data 142, the metadata 144, and a signature 152. It is understood that the file container 150 is a graphical representation of the data and, although shown as a continuous block, it is understood that the file container 150 may be stored in nonconsecutive blocks 115 at multiple locations throughout the storage module 110. Similar to the unmanaged file 140, the metadata 144 for the file container 150 may be contained in a separate location according to characteristics of the operating system 122 in use on the device. The signature 152 is stored at a known location with respect to the file data 142 and may be appended, for example, to the front or end of the file data 142. The metadata 144 for the file container 150 may contain pointers to the locations at which the signature 152 and the file data 142 is stored according to the operating system 122 requirements.

In operation, the access manager 126 interfaces with a file system 128 for the operating system 122 to manage access to files 140 and file containers 150 stored on the storage module 110. An application 120 attempting to access a file 140 or file container 150, referred to herein as a calling application, is unaware of whether file data 142 being accessed is stored in an unmanaged standard file 140 or is part of a managed file container 150. The application 120, or a process, being executed requests file access 121 via operating system function calls. The operating system function calls provide a uniform interface for each application 120 on a particular computing device 20, 30, 40, 50, or 60 to access data available to that device. An exemplary file access 121 between the application 120 and the operating system 122 is a read request. The operating system 122 passes the function call to its virtual, file system 124. The virtual file system 124 further allows each application 120 to issue a uniform read request when, for example, file data 142 may be stored on a network drive, having a first configuration of blocks 115, or a local drive, having a second configuration of blocks 115. The virtual file system 124 interprets the read request and converts it to the appropriate file access request for the underlying file system 128. On computing devices without the access manager 126 installed, the read request from the virtual file system 124 would be passed directly to the file system 128. When the access manager 126 is installed, the access manager 126 intercepts system commands passed between the virtual file system 124 and the file system 128. The access manager 126 is thereby able to control access to the requested file data 142.

Figure 4:
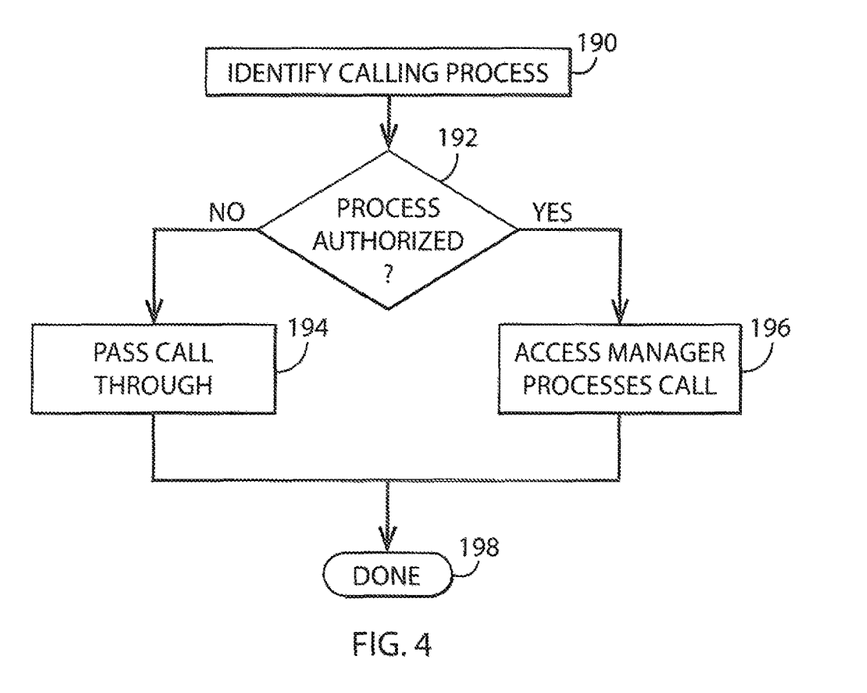
FIG. 4 is a flowchart illustrating the steps performed by the access manager to check whether a calling application is authorized, to access a file container.

With primary reference next to FIG. 4 and occasional reference to FIGS. 1-3, when the access manager 126 intercepts a system command, the access manager 126 performs an initial step of determining whether the calling application is authorized to access the file data 142 within a file container 150. Certain applications may be permitted to move files 140 without accessing the file data 142. For example, a file utility may perform a file copy or a mail utility may attach a file to an electronic mail message. In either example, the application may move a file 140 but does not need to access the contents of the file. The file access request is typically performed by a process (referred to herein as the calling process). At step 190, the calling process is identified. At step 192, the calling process is compared to an authorized list of processes that may access the file data 142 within a file container 150. For example, a word processing program may need access to the file data 142. However, a file directory process may only need access to the metadata 144 for the file container 150 such that the file container 150 may be listed in the directory and moved or copied if desired. A rules engine may store the authorized list of processes at a remote location, such as on the server 12 of the enterprise 10. Optionally, the rules engine, or a copy thereof, may be stored locally on the computing device 20, 30, 40, 50, or 60. Periodic updates to the rules engine may be issued, for example, by a vendor of the access manager 126.

If the calling process is not authorized to access the file data 142, the access manager 126 passes file calls through as if it were not present, as shown in step 194. In other words, the access manager treats a file 140 and a file container 150 in the same manner for those calling processes not authorized to access file data 142 in a file container 150. If for example, a file utility is attempting to copy a file, the access manager 126 will pass back an appropriate file handle to the file utility whether it is trying to copy a file 140 or a file container 150. The metadata 144 in either the file 140 or file container 150 may be accessed to identify at which blocks 115 within the block storage 114 the file data 142 and signature 152, if present, are stored. The access manager 126 reads the file 140 or file container 150 from the data storage module 110, and the file 140 or file container 150 may be copied, in their entirety by the file utility. Whether an unauthorized calling process was attempting to access a file 140 or a file container 150, the calling process will be unaware that the access manager 126 intercepted the access request and execution proceeds in the same manner as if the access manager 126 were not present. If the unauthorized calling process was attempting to access a file container 150, the entire file container 150 is transferred as block data without extracting the file data 142 or the signature 152. If the calling process is attempting, for example, to copy the file, the file container 150 may be copied. The signature 152 is passed intact such that future attempts to access the file data 142 must have proper authorization.

In some instances, a calling process not on the authorized list may, for example, be attempting to access the file data 142 rather than just copying the file data 142. In this circumstance, the access manager will similarly pass the call through, as shown at step 194. Once again, the access manager 126 will pass the appropriate file handle back to the calling process as if it were not present. If the calling process is attempting to access a file 140, it will read the file data 142 in the same manner as if the access manager were not present. If, however, the calling process is attempting to access a file container, the format of the data returned will be incorrect due to the insertion of the signature 152. To the calling process, the file container 150 will appear as a file with an improper format and the calling process will be unable to access the file data 142.

Figure 5:
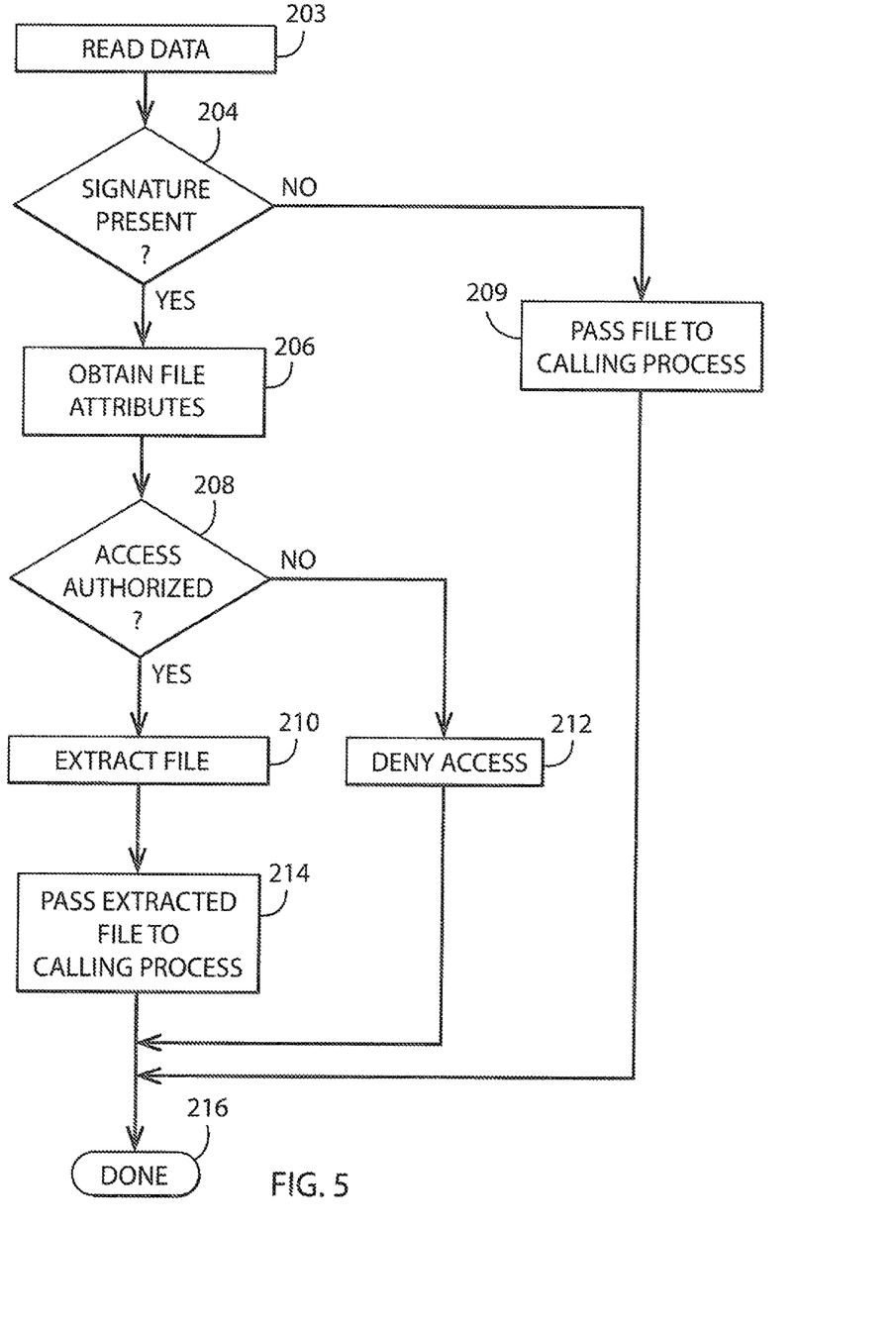
FIG. 5 is a flowchart illustrating the steps performed by the access manager when an authorized application issued a file access request to read a file.
Figure 6:
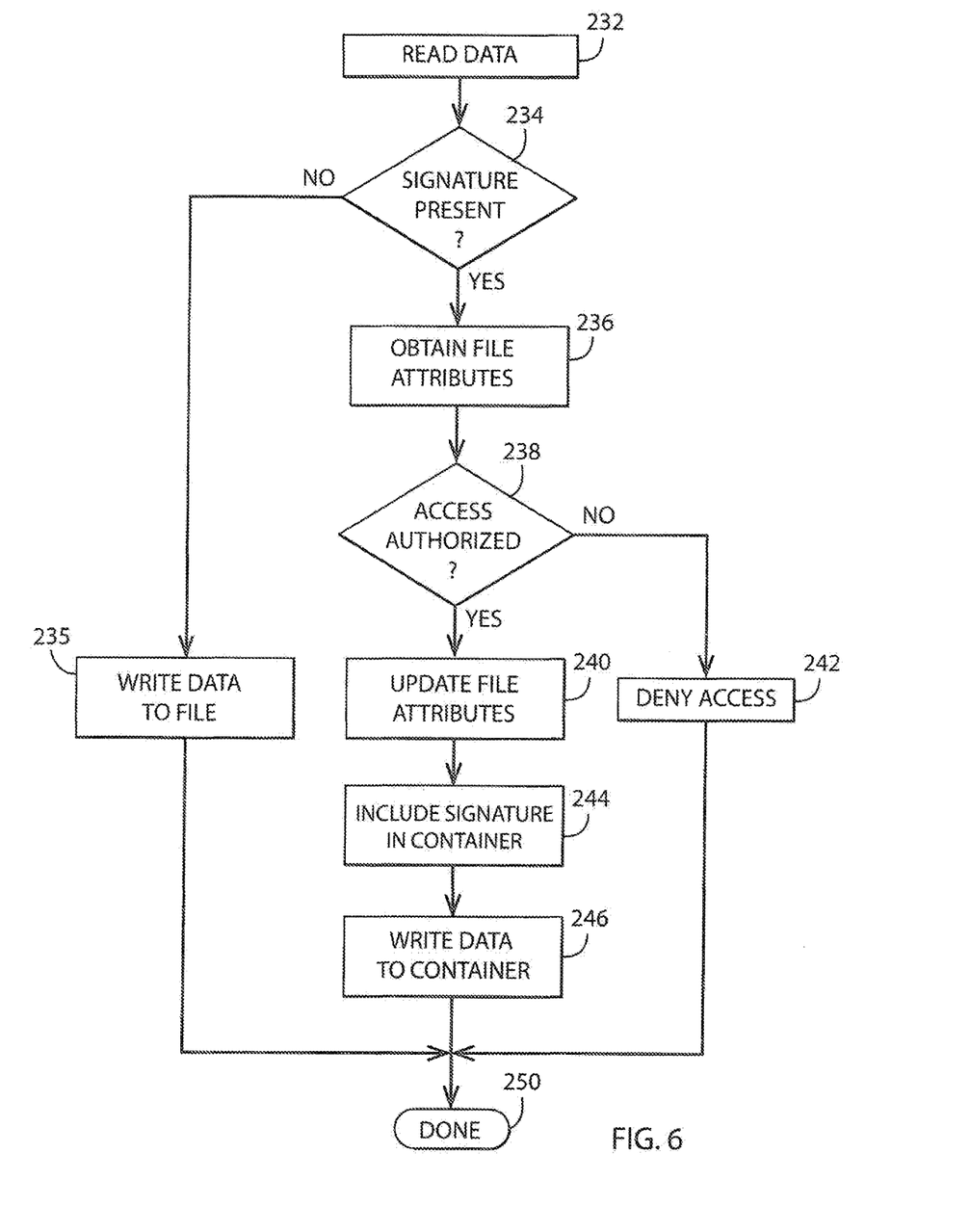
FIG. 6 is a flowchart illustrating the steps performed by the access manager when an authorized application issued a file access request to write to an existing file.

In contrast, if the calling process is on the authorized list, the access manager 126 will manage the function call, as shown in step 196. FIGS. 5 and 6 illustrate the steps performed by the access manager 126 when managing a read function call and a write function call respectively. At step 198, the access manager 126 is done responding to a function call whether it passes the call through or manages the call.

With primary reference next to FIG. 5 and occasional reference to FIGS. 1-3, the steps performed when file data 142 is being accessed for a "read" function are illustrated. As indicated above, an application 120 may require file access. The file access request is typically performed by a process (referred to herein as the calling process). If the calling process is authorized to access the file data 142, the access manager 126 moves to step 203 to execute the next steps in the read request. At step 203, the access manager 126 reads the data from the data storage module 110. The access manager 126 utilizes the metadata 144 for the file 140 or file container 150 to retrieve the file data 142 from the block storage 114. If the metadata is pointing to a file container 150, the access manager 126 also reads the signature 152 from the block storage 114. The file data 142 and signature 152 may be stored in non-volatile memory 104 on the processing component 100, such as a system cache, after being retrieved from the data storage module 110. At step 204, the access manager 126 checks to determine if the signature 152 is present in the data just retrieved from the data storage module 110. If no signature 152 is present, the calling process was requesting a file 140 which is not being managed by the secure file access system. The access manager 126 passes the file data 142 back to the calling process, as shown in step 209, by returning the system call to the virtual file system 124 indicating that the file data 142 has been read, and the operating system 122 returns the file data 142 to the calling application. If the file data 142 for the accessible file 140 is large or the calling application 120 needs to make repeated access to the accessible file 140, the access manager 126 passes system calls between the virtual file system 124 and the file system 128. According to one embodiment of the invention, the access manager 126 may evaluate each system call. According to another embodiment of the invention, the access manager 126 may identify a connection between the calling application 120 and the accessible file 140 and pass system calls without further evaluation until the connection has been closed.

If, however, at step 204, the access manager 126 determines that the signature 152 is present, the access manager 126 is aware that the file data 142 to be accessed is managed by the file access system. The access manager 126 then retrieves the file attributes 206 for the file container 150 to determine whether the calling application 120 may access the file data 142 in the file container 150. The file attributes may be stored either on the local data storage module 110 or on a data storage module making up, in part, the enterprise server 12.

The file attributes may be stored in a database, data file, or in any other suitable data repository. Creation of the file attributes will be discussed in more detail below. Based on the file attributes, the access manager 126 determines whether the read request is authorized, as shown at step 208. If the read request is not authorized, the access manager 126 denies access to the file data 142, as shown in step 212. After denying access, the access manager 126 returns a system level message to the virtual file system 124, which, in turn, reports to the calling application 120 that access to the file data 142 was denied. Optionally, denial of access may include generating a message for display on the computing device indicating generally that the access was denied or more specifically identifying why the access was denied. The message may indicate, for example, that a maximum number of reads of the file container 150 was exceeded or a time-limited access duration has expired.

If it is determined in step 208 that the read request is authorized, the access manager 126 extracts the file data 142 from the file container 150, as shown in step 210. At step 214, the access manager 126 then passes the file data 142 extracted from the file container 150 to the calling application 120 via the virtual file system 124. The virtual file system 124 indicates that the file data 142 has been read, and the operating system 122 returns the file data 142 to the calling application 120. If the file data 142 in the file container 150 is large or the calling application 120 needs to make repeated access of the file container 150, the access manager 126 manages the repeated file access requests. After opening a file container 150, the access manager 126 may repeatedly access the file data 142 without checking the file attributes. Once the access manager 126 closes the file container 150, the steps illustrated in FIG. 5 must be repeated. Optionally, the access manager 126 may be configured to evaluate each system call according to the steps described above. When the file data 142 has either been retrieved from the data storage module 110 or access has been denied, the read request is complete, as shown in step 216.

As indicated above, the access manager 126 utilizes a set of stored file attributes to determine whether access should be granted to file data 142 within a file container 150. When a file is created, an initial set of file attributes is defined for the file. The file attributes define file access permissions to the file. The file attributes may be stored locally on the computing device 20, 30, 40, 50, 60 attempting to access the file container, or remotely on a server 12 within the enterprise 10.

A network administrator may initially configure a set of rules by which the file attributes are generated. According to one aspect of the invention, file attributes may be generated based on an access level assigned to individual users. Each user may be required to provide, for example, a username and password as identification credentials. Optionally, other identification credentials provided, for example, via a biometric scanner detecting the user's voice, retinal scan, or thumbprint. When each user logs on to one of the computing devices 20, 30, 40, 50, 60, access levels for each user may be retrieved identifying, for example, specific network drives and/or directories to which a user may have access. Optionally, a user may have various levels of access, such as read access only, read and write access, or permission to delete a file container 150. The level of access may vary for users based on other directories within a drive, different network drives, or even based on different computing devices by which the user is accessing the file. For example, a user may have a first level of access when attempting to access a file by a desktop computer 20 within the enterprise and a second level of access when attempting to access a file by a smart phone 40 from a remote location.

According to still another aspect of the invention, a user may be granted permission to change the attributes of a file container 150 or optionally, the administrator may define rules that change file attributes based on a user's actions. For example, if a user wishes to copy a file container 150 from a network drive connected to the server 12 to a mobile computing device 30, the user may be prompted whether there are to be any restrictions as to access of the file container 150. The user may indicate that the file container 150 may be accessed a limited number of times or for a limited duration. According to another example, if a user attached a file container 150 to an electronic mail message, the user may be similarly prompted to indicate whether there are to be any restrictions as to access of the file container 150. The user may indicate that the file container 150 may be accessed only by the recipient of the mail message or for a specified duration. In these examples, the user specified restrictions may be placed in the file attributes database for the copy of the file container 150 placed on the mobile computing device 30 or attached to the electronic mail message. Thus, when the copy is opened, the user specified restrictions are applied to the copy of the file container 150.

Similarly, the administrator may define rules such as limiting the number of times a file container 150 may be copied or permitting only read access to copies of file containers 150 not located on the server 12. If, for example, a user copies the file container 150 to a mobile computing device 30 or attaches a copy of a file container 150 to an electronic mail message and the administrator has set a limit of a single copy of the file container 150, the file data 142 in the file container may be accessed by an access manager 126 executing on the mobile computing device 30 or on a computing device of the recipient of the electronic mail message. However, the file attributes for the copy of the file container 150 will indicate that the file container 150 on the mobile computing device 30 or attached to the electronic mail message cannot be copied again. If an attempt is made to make additional copies from the first copy, the file attributes for each of those further copies will prohibit access to the file data 142. As a result, even if the file container 150 is copied beyond the number of times authorized by the administrator's rule, the file data 142 will not be accessible.

According to still another aspect of the invention, the mobile computing device 30 may include a set of local file attributes which may be synchronized with the file attributes on the file server 12. When the mobile computing device 30 is removed from the enterprise 10, the user may log in to the server 12 remotely via the internet or may operate disconnected from the server 12. If the remote user is connected to the server 12, the access manager 126 preferably accesses the file attributes on the file server 12. If the remote user is not connected to the server 12, the access manager 126 may access the local set of file attributes.

In addition to granting permission based on user credentials, the file attributes may store numerous other conditions upon which permission to access a file may be granted. For example, a copy of a file attached to an email may be configured to be accessible only by the user to which the file was emailed. Optionally, the user may define a set duration for which the file is accessible after being emailed. Still other attributes may be defined, for example, the IP address of the host of the file, the MAC address of the host of the file, the number of times the file has been opened, and users of an external registration system.

In a manner similar to that described above with respect to a read request, the access manager 126 interfaces with the file system 128 for the operating system 122 to manage access to files 140 and file containers 150 stored on the storage module 110 when a write request is issued from a calling application 120. The calling application 120 is unaware of whether file data 142 being is stored in a readily accessible file 140 or is part of a managed container 150. The application 120 requests file access 121 via operating system function calls. The operating system 122 passes the function call to its virtual file system 124. The virtual file system 124 interprets the write request and converts it to the appropriate file access request for the underlying file system 128. On computing devices without an access manager 126 installed, the write request from the virtual file system 124 would be passed directly to the file system 128. When the access manager 126 is installed, the access manager 126 intercepts system commands passed between the virtual file system 124 and the file system 128. The access manager 126 is thereby able to control access to the requested file data 142.

Referring next to FIG. 6, the steps performed when a request is issued to access an existing file container 150 in order to overwrite a portion or all of the file data 142 are illustrated. As discussed above with respect to FIG. 4, the access manager 126 first determines when the calling application is authorized to access file data 142. If the calling process is authorized to access the file data 142, the access manager 126 moves to step 232 to execute the steps in the write request.

The access manager 126 receives the write request from the calling application, and must first determine whether the file data 142 is to be written to an unmanaged file 140 or a file container 150. Therefore, the access manager 126 reads the file data 142 and the signature 152, if present, of the file 140 or file container 150 from the data storage module 110, as shown in step 232. The file data 142 and signature 152 may be stored in non-volatile memory 104 on the processing component 100, such as a system cache, after being retrieved from the data storage module 110. At step 234, the access manager 126 checks if the signature 152 is present in the data just retrieved from the data storage module 110. If no signature 152 is present, the access manager 126 passes the system call to the file system 128 to allow the file system 128 to write the new file data 142 to the unmanaged file 140, as shown in step 235. If the new file data 142 to be written to the file 140 is large or the calling application 120 needs to make repeated access of the file 140, the access manager 126 passes system calls between the virtual file system 124 and the file system 128. According to one embodiment of the invention, the access manager 126 may evaluate each system call. According to another embodiment of the invention, the access manager 126 may identify a connection between the calling application 120 and the accessible file 140 and pass system calls without further evaluation until the connection has been closed.

If, however, at step 234, the access manager 126 determines that the signature 152 is present, the access manager 126 is aware that the file container 150 to which the application 120 is attempting to write is managed by the file access system. The access manager 126 then retrieves the file attributes 236 for the file container 150 to determine whether the calling application 120 may modify the file data 142 in the file container 150. As previously discussed, the file attributes may be stored either on the local data storage module 110 or on a data storage module making up, in part, the enterprise server 12. Based on the file attributes, the access manager 126 determines whether the write request is authorized, as shown at step 238. If the write request is not authorized, the access manager 126 denies access to the file container 150, as shown in step 242. After denying access, the access manager 126 returns a system level message to the virtual file system 124, which, in turn, reports to the calling application 120 that access to the file data 142 was denied. Optionally, denial of access may include generating a message for display on the computing device indicating generally that the access was denied or more specifically identifying why the access was denied. For example, the file container 150 may be designated as read-only or may require a higher user access level in order to be overwritten. However, if it is determined in step 238 that the write request is authorized, the access manager 126 updates file attributes, if required, as shown in step 240. For example, if a copy of a file container 150 is being edited on a remote computing device 50, connected to the internet 45, the access manager 126 may update the file attributes on the server 12 indicating a newer revision to the copy stored on the server 12 exists. The file attributes for access to the copy on the server 12 may be changed to read only until the original file and the edited copy are synchronized. At step 244, the access manager 126 verifies that the signature 152 for the file data being modified is present or, alternately, rewrites the signature into the file container 150. In this manner, if a user attempts to copy a file, for example, by editing the file data and saving it to a new location, the signature 152 is copied along with the file data 142. Without the signature 152, the file container 150 is essentially an unmanaged file 140. Therefore, ensuring that the signature 152 is present and/or rewritten when either a portion or all of the file data 142 is written back to the storage module 110 ensures that the file data 142 being modified remains under control of the access management system. At step 246, the file data 142 to be modified is then inserted into the file container 150. As indicated above, the file data is initially read from the data storage module 110 into cache to check for the signature. Inserting new data into the file data 142 commonly occurs in cache for rapid file access. The signature 152 and the file data 142 are then transferred, or written, to the data storage module 110. If the file data 142 in the file container 150 is large or the calling application 120 needs to make repeated access of the file container 150, the access manager 126 manages the repeated file access requests. After opening a file container 150, the access manager 126 may repeatedly write the file data 142 without checking the file attributes. Once the access manager 126 closes the file container 150, the steps illustrated in FIG. 6 must be repeated. Optionally, the access manager 126 may be configured to evaluate each system call according to the steps described above. When the file data 142 has either been written to the data storage module 110 or access has been denied, the write request is complete, as shown in step 250.

The secure file access system allows a network administrator to secure file data 142 both within and outside of an enterprise 10. The network administrator establishes rules by which file attributes are assigned. The rules may define, for example, who has access to a file, the level of access (e.g., read, write, or copy)), a duration of access, and the like. The file attributes are stored in a file attribute database accessible by computing devices 20, 30, 40, 50, 60 connected to the enterprise 10. The computing devices 20, 30, 40, 50, 60 may be connected either from within or external to the enterprise 10. Optionally, a remote computing device 60 unable to connect to the enterprise 10 may have a portion of the file attribute database loaded into a local copy on the remote computing device to permit access to file data 142 when the remote computing device 60 is not connected to the enterprise 10.

To secure file data 142 within unmanaged files 140, the secure file access system assigns a signature 152 to each file 140, and the signature 152 and file data 142 are packaged within a file container 150. To the operating system 122, each file container 150 appears the same as an unmanaged file 140. For example, an unmanaged file 140 and a file container 150 containing the same file data 142 may both be saved in a directory on a drive with the same file extension. However, due to the signature 152 and packaging of the signature 152 and file data 142 into the file container 150, an application 120 attempting to access the file container 150 without the access manager 126 would detect an error in the file. For example, if a word processing application attempted to open a document in the unmanaged file 140, the document would display in the word processing application. However, if the word processing application attempted to open the file container 150 directly without the access manager 126, the file would appear corrupted or of the wrong format, and the word processing application would be unable to open the file container 150.

The access manager 126 allows applications executing on the local device to access file containers 150. The access manager 126 intercepts file access requests at the operating system level and identifies whether a file is an unmanaged file 140 or a file container 150. If a file being accessed is an unmanaged file 140, the access manager 126 passes system calls between the virtual file system 124 and the file system 128. If, however, the file being accessed is a file container 150, the access manager 126 reads the signature 152 from the file container 150, checks the file attributes to verify that the file container 150 may be accessed by a current user, at the particular computing device, at the particular time, or as defined by any other file attribute or attributes. If the access manager 126 determined that the file container 150 may be accessed, it unpackages the file data 142 from the file container 150 and passes the file data 142 to the calling application 120. By loading the access manager 126 on each computing device 20, 30, 40, 50, 60 which needs to access the file data 142 and by providing access to a central file attributes database, the secure file access system provides an improved method of managing access to files.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A system for managing access to a plurality of files on a storage module in communication with a computing device, the system comprising:
   an access manager stored in a memory of the computing device;
   a processor operative to execute the access manager, wherein the access manager is operative to receive a file access call by an operating system on the computing device;
   at least one standard file stored on the storage module, wherein each standard file is one of the plurality of files stored on the storage module and each standard file includes metadata and file data;
   at least one file container stored on the storage module, wherein each file container is one of the plurality of files stored on the storage module and each file container includes metadata, file data, and a signature and wherein the signature is appended to the file data; and
   a file attribute database including access rights to the file data in each of the at least one file containers, wherein the access rights are defined as a function of at least one attribute of the respective file container, wherein:
      when the file access call attempts to access one of the at least file containers, the access manager reads the signature from the respective file container,
      the access manager determines whether access to the file data for the respective file container is authorized as a function of the signature and of the access rights stored in the file attribute database,
      the access manager returns only the file data as file data via the file access call when access to the file data for the respective file container is authorized, and
      the access manager returns the signature and the file data as file data via the file access call when access to the file data for the respective file container is not authorized.

2. The system of claim 1, wherein the access manager is operative to return a file handle for the respective standard file when the file access call attempts to access one of the at least one standard files.

3. The system of claim 1, wherein the computing device is a first computing device and the file attribute database is stored on a second computing device remote from the first computing device.

4. The system of claim 3, wherein the first computing device is connected to the second computing device via a network, and the file attribute database can be read and updated by the access manager running on the first computing device.

5. The system of claim 1, wherein at least a portion of the file attribute database is stored on the storage module.

6. The system of claim 1, wherein a file permission associated with the at least one attribute for the at least one file container in the file attribute database is dynamically modified by the access manager.

7. The system of claim 1 further comprising an authorized list identifying a plurality of applications that are allowed to access the file data stored in each file container, wherein the access manager is further operative to:
   receive a file access request from a calling application to access one of the at least one standard file and the at least one file container,
   determine whether the calling application is present in the authorized list,
   pass a file handle to the calling application corresponding to one of the at least one standard file and the at least one file container identified in the file access request when the calling application is not in the authorized list, and
   read the signature from the file container and check the file attribute database when the calling application is present in the authorized list.

8. A method of managing access to file data by a computing device in communication with a storage medium on which the file data is stored, the method comprising the steps of:
   receiving a file access request with an access manager on the computing device from an application executing on the computing device, wherein:
      the file access request is a request to access file data from one of a file container and a standard file,
      the file container and the standard file are both stored on the storage medium,
      the standard file includes file data, and
      the file container includes file data and a signature appended to the file data;
   identifying whether the signature is appended to the file data for each file access request with the access manager;
   when the signature is appended to the file data reading the signature from the file container;
   checking at least one file attribute for the file container to authorize access to the file data in the file container as a function of the signature;
   passing only the file data from the file container as file data to the application via the access manager when the at least one file attribute indicates the access request is authorized; and
   passing the signature and the file data from the file container as file data to the application via the access manager when the at least one file attribute indicates the access request is not authorized.

9. The method of claim 8, wherein after receiving the request to access the file container, the method further comprises the steps of:
   determining whether the application is present in an authorized list, wherein the authorized list identifies a plurality of applications that are allowed to access the file data stored in the file container;
   when the application is not in the authorized list, passing a file handle to the calling application corresponding to one of the file container and the standard file identified in the file access request, and
   when the application is in the authorized list, executing the steps of identifying whether the signature is appended to the file data, checking the at least one file attribute, and passing the file data to the application.

10. The method of claim 8 wherein the step of checking the at least one file attribute for the file container to authorize access to the file container as a function of the signature further comprises the steps of:
    identifying the at least one file attribute in a file attribute database, wherein the at least one file attribute is associated with the signature; and
    reading the at least one file attribute and a file permission associated with the at least one file attribute from the file attribute database.

11. The method of claim 10 wherein:
    the computing device is a first computing device,
    the file attribute database is located on a second computing device remote from the first computing device, and
    the first computing device is in communication with the second computing device via a network.

12. The method of claim 10 wherein at least a portion of the file attribute database is stored on the storage medium.

13. The method of claim 10 further comprising the step of updating the at least one file attribute with the access manager after passing the file data to the application.

14. A system for managing access to a storage module in communication with a computing device, wherein the storage module includes at least one file container and at least one standard file, the system comprising:
    an access manager stored in a memory of the computing device;
    a file system operative to manage file storage on the storage module; and
    a processor operative to execute an operating system and the access manager, wherein the operating system is configured to:
       receive an operating system function call from an application operating on the computing device to access a file, wherein:
          the file in the operating system function call is one of the at least one file container and the at least one standard file,
          the at least one file container includes metadata, file data, and a signature appended to the file data, and
          the standard file includes metadata and file data, and
       generate a file access request to the file system responsive to the operating system function call;
    wherein the access manager is configured to:
       receive each file access request to the file system generated by the operating system,
       read the file data from the file identified by the operating system function call,
       identify whether the file is one of the at least one file container and the at least one standard file as a function of whether the signature is present in the file, and
       read at least one file attribute corresponding to a file permission for the file from a file attribute database when the file is the at least one file container; and
    wherein:
       the operating system function call is one of a first function call and a second function call,
       the first function call is a read request,
       the second function call is a write request, when the operating system function call is the first function call and the file data is stored inside the file container, the access manager is further configured to:
- verify that the file permission corresponding to the at least one file attribute permits a read,
- when a read is permitted, return only the file data as file data via the read request, and
- when a read is not permitted, return the signature and the file data as file data via the read request.

15. The system of claim 14 wherein when the operating system function call is the second function call and when the file data is stored inside the file container the access manager is further configured to:
- verify that the file permission corresponding to the at least one file attribute permits a write,
- when a write is permitted, update the at least one file attribute in the file attribute database, write the signature to the file container, and write the file data to the file container, and
- when a write is not permitted, prohibit writing to the file data by the application operating on the computing device.

16. The system of claim 14, wherein at least a portion of the file attribute database is stored on the storage module.

* * * * *